(12) United States Patent
Johnston

(10) Patent No.: US 7,822,115 B2
(45) Date of Patent: Oct. 26, 2010

(54) SYSTEMS FOR GENERATING A PULSE WIDTH MODULATED SIGNAL

(75) Inventor: Peter Johnston, San Mateo, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 900 days.

(21) Appl. No.: 11/479,294

(22) Filed: Jun. 30, 2006

(65) Prior Publication Data

US 2008/0002228 A1   Jan. 3, 2008

(51) Int. Cl.
  *H03K 7/08*   (2006.01)
  *H03K 3/017*  (2006.01)
(52) U.S. Cl. ..................... 375/238; 327/172
(58) Field of Classification Search ............... 375/238, 375/239, 240, 242; 327/172; 358/3.01, 3.23; 347/252, 240
See application file for complete search history.

(56) References Cited

U.S. PATENT DOCUMENTS

| | | | |
|---|---|---|---|
| 4,782,398 A | 11/1988 | Mita | |
| 5,041,920 A | 8/1991 | Hayes et al. | |
| 5,477,257 A | 12/1995 | Murata | |
| 5,646,670 A | 7/1997 | Seto et al. | |
| 5,739,842 A | 4/1998 | Murata | |
| 5,760,811 A | 6/1998 | Seto et al. | |
| 5,946,334 A * | 8/1999 | Ema et al. | 372/38.01 |
| 6,092,171 A | 7/2000 | Relph | |
| 6,215,513 B1 | 4/2001 | Ashikaga | |
| 6,252,675 B1 | 6/2001 | Jacobs | |
| 6,369,911 B1 | 4/2002 | Hattori | |
| 6,472,946 B2 | 10/2002 | Takagi | |
| 6,476,847 B2 | 11/2002 | Satoh et al. | |
| 6,498,617 B1 * | 12/2002 | Ishida et al. | 347/252 |
| 6,603,116 B2 | 8/2003 | Niito | |
| 6,707,563 B1 | 3/2004 | Barry et al. | |
| 6,731,317 B2 | 5/2004 | Ema et al. | |
| 6,775,032 B2 | 8/2004 | Jacobs | |
| 7,009,729 B2 | 3/2006 | Fujita | |

(Continued)

OTHER PUBLICATIONS

U.S. Appl. No. 11/479,562, filed Jun. 30, 2006.

(Continued)

*Primary Examiner*—Khai Tran
(74) *Attorney, Agent, or Firm*—Finnegan, Henderson, Farabow, Garrett & Dunner, LLP

(57) ABSTRACT

Systems in accordance with the presently claimed invention use input data to create an output pulse that is a fraction of the width of an input pulse. In some embodiments, the invention accepts input data and an input signal that has pulses of a specific frequency. In some embodiments, the invention uses a phase lock loop to create multiple signals of a higher frequency than the frequency of the input signal. Each of these multiple signals is offset by a certain phase from the other signals. In some embodiments, the invention synchronizes the input data to each of these multiple signals. The invention uses the phase difference between the multiple signals to create an output pulse as a function of the input data that is a fraction of the width of the input pulse.

17 Claims, 11 Drawing Sheets

U.S. PATENT DOCUMENTS

| | | |
|---|---|---|
| 7,031,025 B1 | 4/2006 | He et al. |
| 7,038,671 B2 | 5/2006 | Willis et al. |
| 7,064,859 B1 | 6/2006 | Dittrich et al. |
| 2001/0030769 A1 | 10/2001 | Jacobs |
| 2001/0030796 A1 | 10/2001 | Yao |
| 2004/0156079 A1 | 8/2004 | Marshall et al. |
| 2006/0001467 A1* | 1/2006 | Fujino et al. ............... 327/172 |
| 2007/0153247 A1 | 7/2007 | Nagasaka |

OTHER PUBLICATIONS

U.S. Appl. No. 11/480,221, filed Jun. 30, 2006.
U.S. Appl. No. 11/479,596, filed Jun. 30, 2006.
U.S. Appl. No. 11/479,896, filed Jun. 30, 2006.
U.S. Appl. No. 11/728,241, filed Jun. 30, 2006.

* cited by examiner

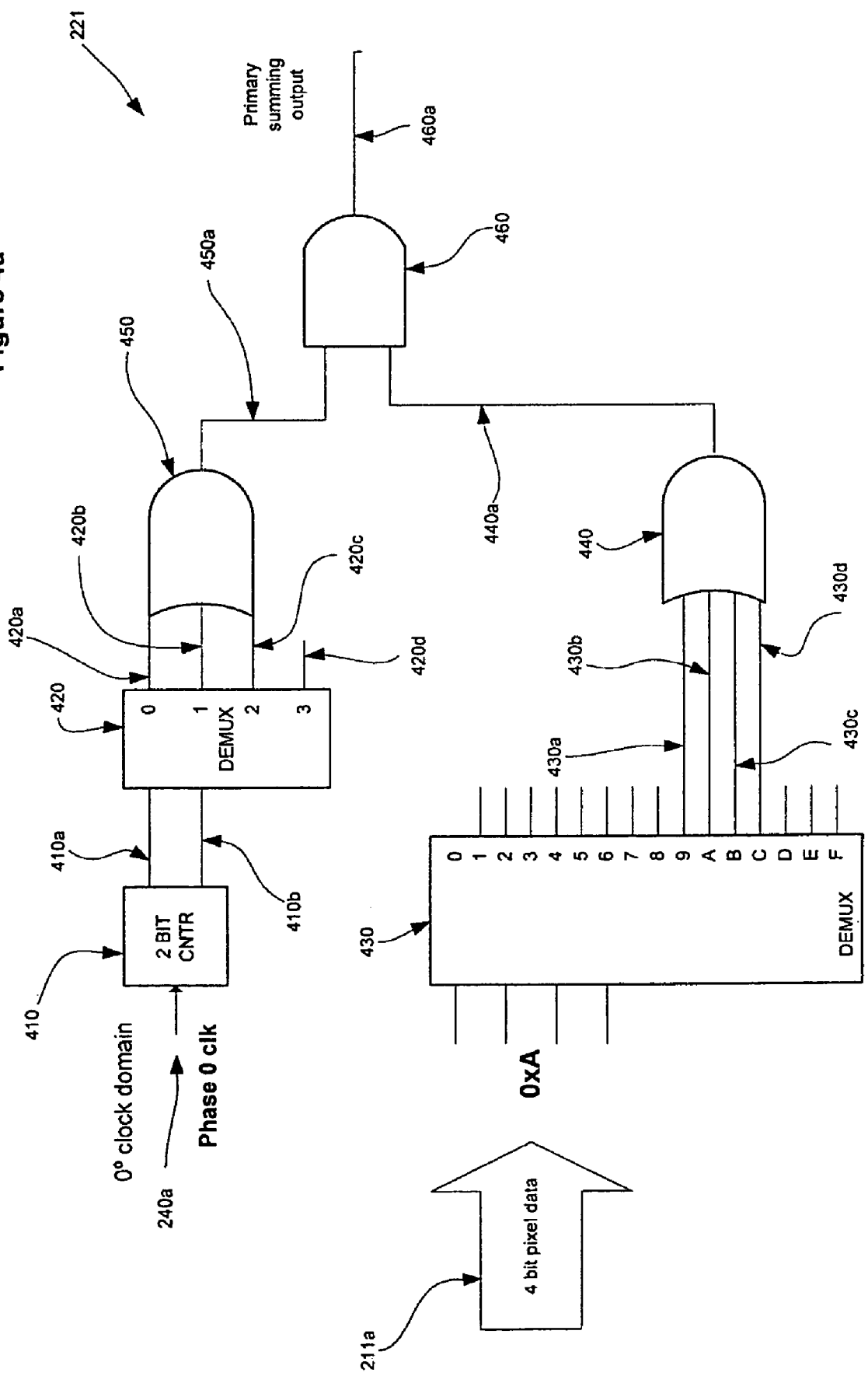

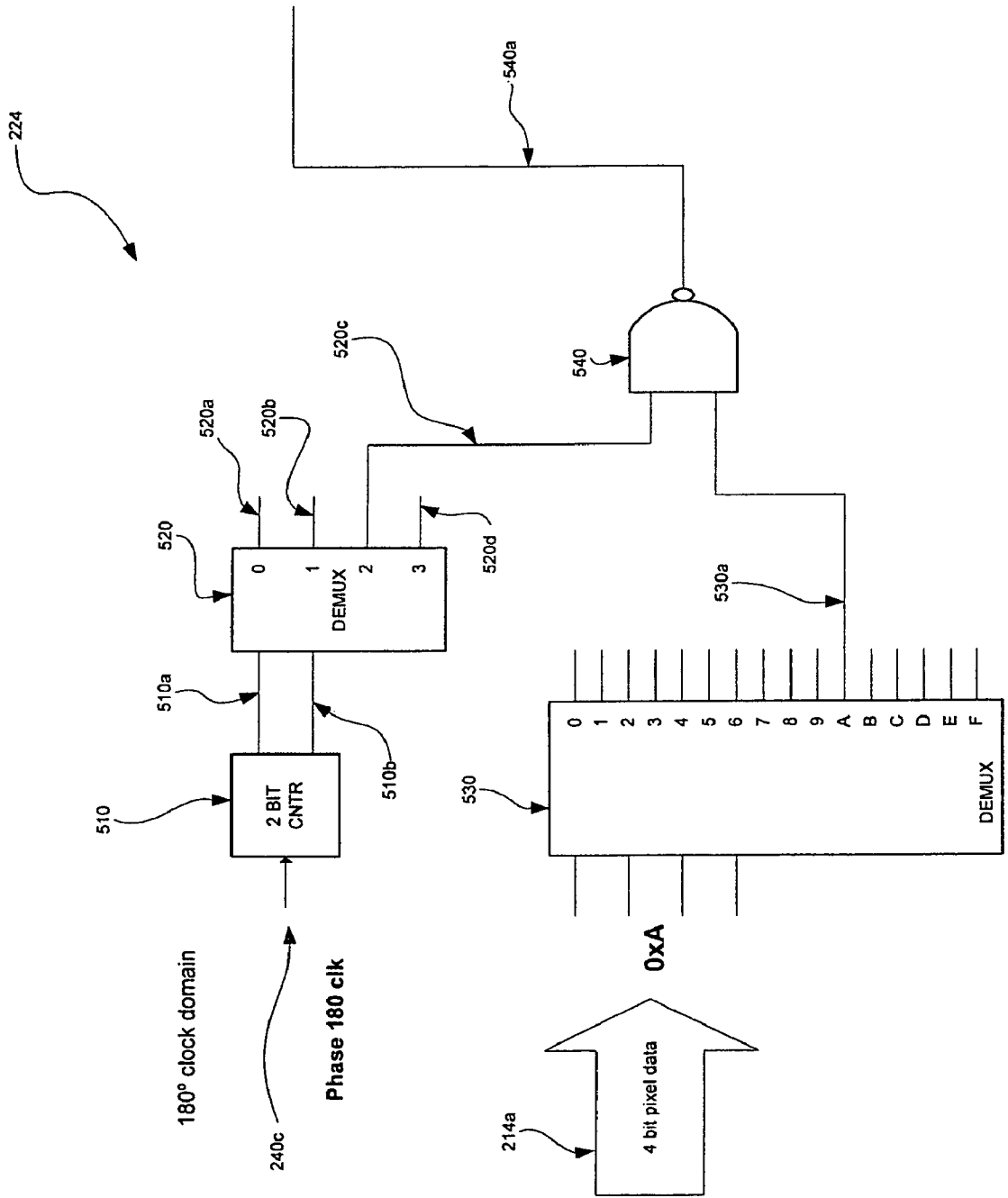

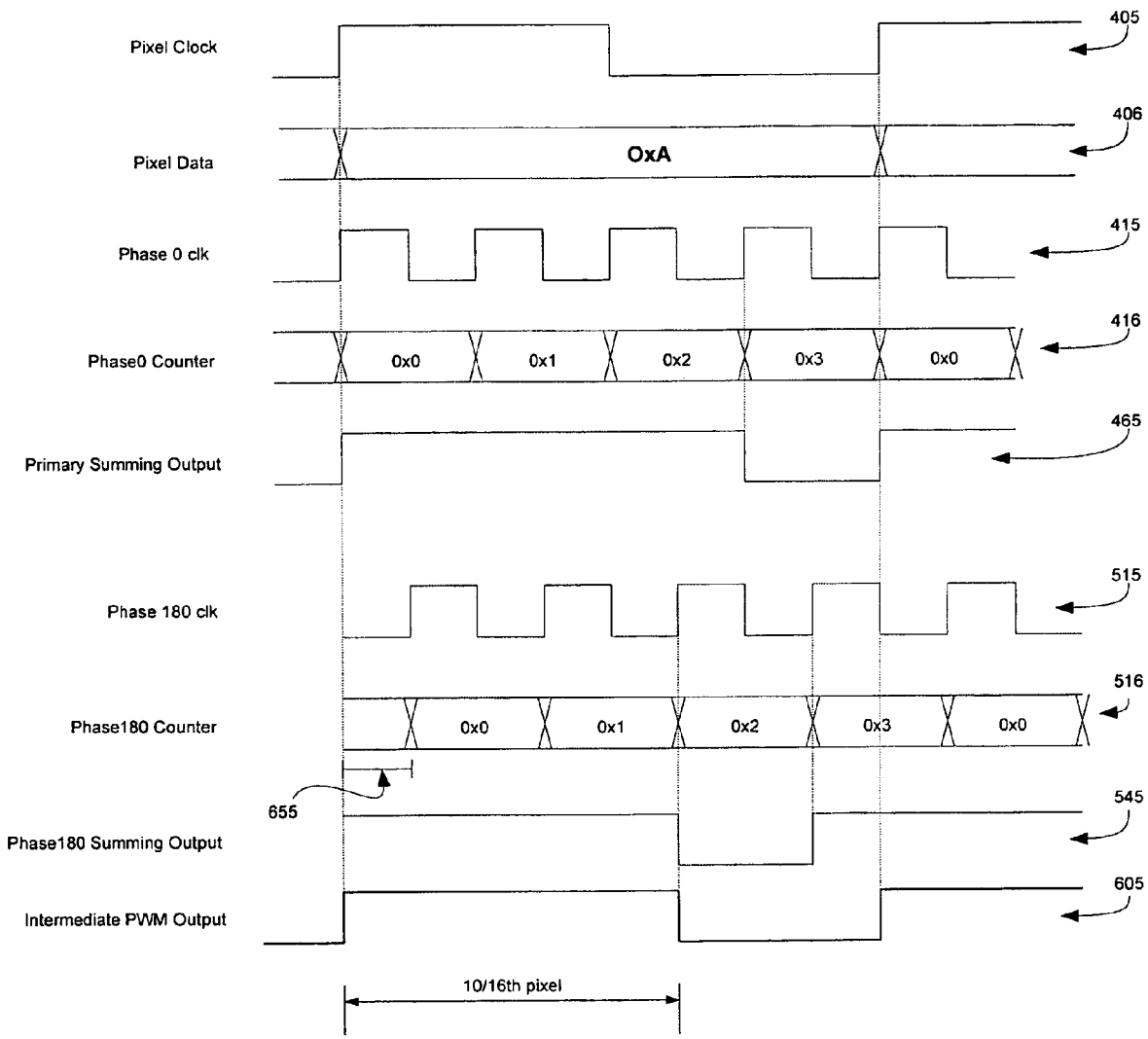

SYSTEMS FOR GENERATING A PULSE WIDTH MODULATED SIGNAL

CROSS REFERENCES TO RELATED APPLICATIONS

This application is related to patent applications entitled "Method and Apparatus for Image Alignment" Ser. No. 11/479,562, "Circuitry to Support Justification of PWM Pixels" Ser. No. 11/480,221, Systems and Methods for Processing Pixel Data for a Printer" Ser. No. 11/479,596, and "Systems and Methods for Processing Pixel Data for a Printer" Ser. No. 11/479,896, all filed concurrently herewith, and all of which are herein incorporated by reference in their entirety.

BACKGROUND

1. Field of Invention

This disclosure relates to creating an output pulse of a circuit, and in particular to modulating the width of the output pulse of a circuit.

2. Description of Related Art

One of the limitations of providing greater resolution in current printer technology involves the width of electrical pulses that are used to generate data. Current printer technology produces pixels by providing a print engine with electrical pulses, where the size of the pixel is a function of the duration of the electrical pulse. Greater resolution for printed material can be obtained by providing data, for example sub-pixel data, at a higher frequency than the base frequency of the electrical pulses used by the print engine. By providing data at a higher frequency, the printer can print a fraction of a pixel instead of a whole pixel, obtaining higher resolution in the process.

In one technique, serial data is provided at a frequency higher than the base frequency of the print engine and uses the serial data of higher frequency to print one dot with a controlled grey-scale level. Providing this serial data, however, requires a pulse generation circuit with much higher resolution than the print engine resolution. Thus, if resolution of the printed material is to be increased by 16 times using the above method, then the serial data must be provided at a frequency 16 times the frequency of the print engine. Thus, if a print engine has a clock running at 30 MHz, then the serial data would need a clock running at 480 MHz. In many cases, this higher clock speed can be obtained only by using a cost-prohibitive integrated circuit ("IC").

Another technique that is used to increase printer resolution involves the use of fixed delays to generate finely controlled pulse widths. One drawback of this approach is that it is not easy to obtain similar pixel modulation performance across a wide range of printer base resolution frequencies. For example, if the circuit is designed to generate 16 grey-scale levels with a base frequency of 1 MHz, the same circuit will only provide 8 grey-scale levels with a different printer of a base frequency of 30 MHz. Another drawback occurs because the delays are typically implemented with IC gate delays that tend to vary widely from IC to IC because of unavoidable process variations.

Accordingly, there is a need for a system and method for generating higher resolution printer images that can be used across a wide range of printer base frequencies.

SUMMARY

In accordance with some embodiments of the present invention, systems and methods for increasing the resolution of a printed image are presented. In some embodiments, data input and a clock signal are received, and a set of clock signals with a higher frequency than the input clock is produced. Each clock signals in the set is of a different phase than other clock signals in the set. The system uses the clock signals in the set to produce an output pulse width modulated signal as a function of the data input.

In some embodiments, multiple pulse width modulation (PWM) circuits may be used to increase printer resolution. In some embodiments, each PWM circuit can receive data input and one of a plurality of clock signals wherein each clock signal has a different phase from the other clock signals. Each PWM circuit may generate a signal that is synchronized with respect to the clock signal received by that PWM circuit. In some embodiments, the outputs from the PWM circuits may be combined as a function of the input data by a logic circuit to produce an output PWM signal. These and other embodiments are further explained below with respect to the following figures.

BRIEF DESCRIPTION OF THE DRAWINGS

FIG. 4a shows a diagram of an exemplary primary summing pulse generator according to some embodiments of the present invention.

FIG. 5a shows a diagram of an exemplary secondary summing pulse generator according to some embodiments of the present invention.

FIG. 6b shows a timing diagram for an exemplary embodiment of a primary summing pulse generator and one of the secondary summing pulse generators according to some embodiments of the present invention.

DETAILED DESCRIPTION

Reference will now be made in detail to one or more exemplary embodiments of the present invention as illustrated in the accompanying drawings. Wherever possible, the same reference numbers will be used throughout the drawings to refer to the same or like parts.

Figure 1:
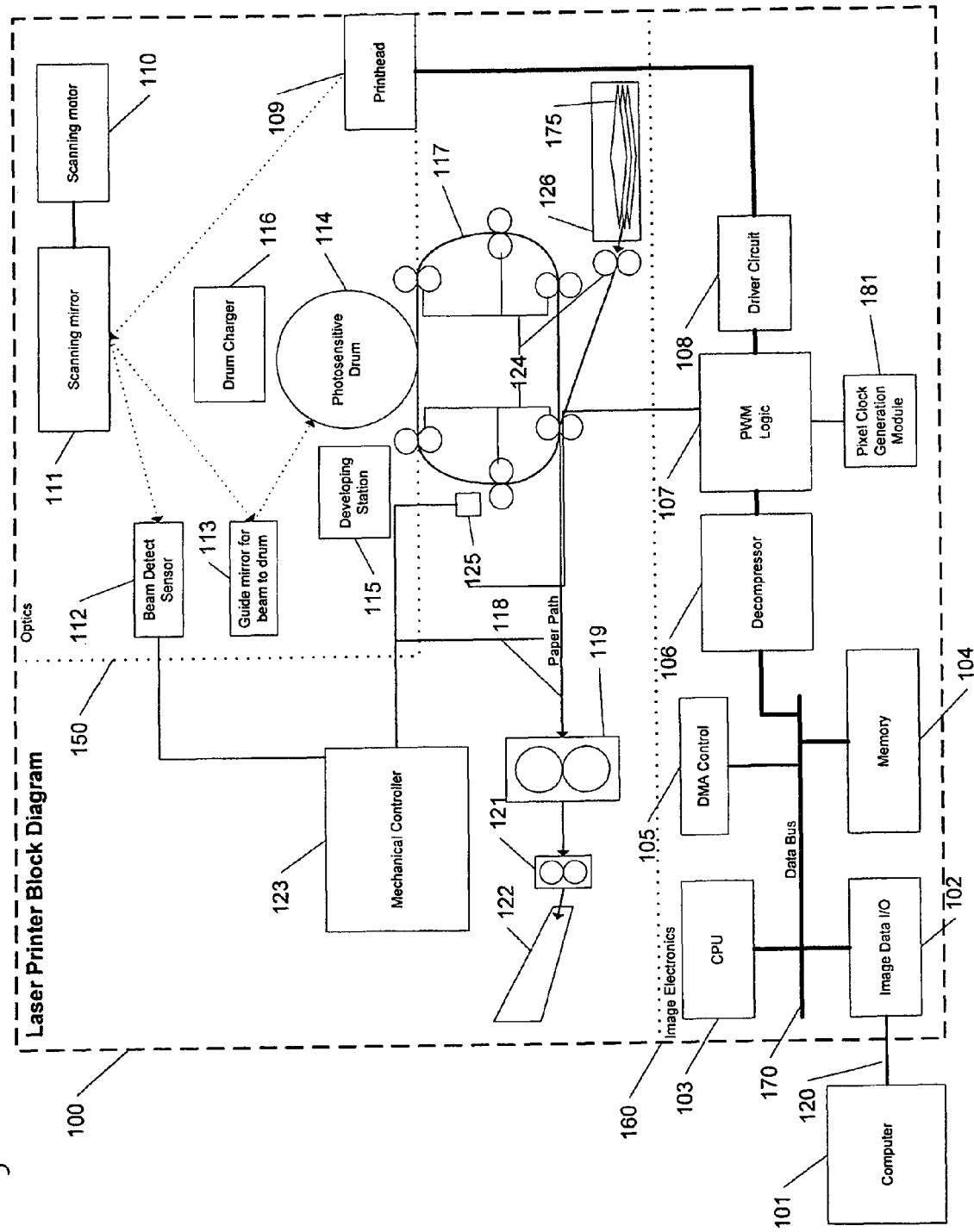
FIG. 1 shows a block diagram of an exemplary printer coupled to an exemplary computer according to some embodiments of the present invention.

FIG. 1 is a block diagram of exemplary printer 100, which is coupled to exemplary computer 101. In some embodiments, printer 100 may be a laser printer, an LED printer, or any other printer consistent with principles of the present invention. Computer 101 may be a computer workstation, desktop computer, laptop computer, or any other computing device capable of being used with printer 100. Connection 120 couples computer 101 and printer 100 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as USB, FIREWIRE and/or serial or parallel ports for transmission of data through appropriate connection 120. The communication links could be wireless links or wired links or any combination consistent with embodiments of the present invention that allows communication between computing device 101, and printer 100.

In some embodiments, data received by printer 100 may be routed internally along internal data paths, such as exemplary data bus 170, and other data and control signal paths (not shown) to various internal functional modules of printer 100 as determined by control logic in printer 100. In some embodiments, data transmitted to printer 100 by computer 101 may also include destination addresses and/or commands to facilitate routing. In some embodiments, data bus 170 may include a subsystem that transfers data or power among modules. In some embodiments, data bus 170 may logically connect several modules over the same set of wires or over separate wires for each connection. In some embodiments, data bus 170 may be any physical arrangement that provides the same logical functionality as a parallel bus and may include both parallel and bit-serial connections. In some embodiments, data bus 170 may be wired in either an electrical parallel or daisy chain topology, or connected by switched hubs.

In some embodiments, image data input/output ("IO") module 102, central processing unit (CPU) 103, direct memory access (DMA) control module 105, memory 104, and decompressor module 106, may be coupled using data bus 170. Data received by image data I/O module 102 may be placed in memory 104 using DMA control module 105 under the control of the CPU 103 according to some embodiments of the present invention. Decompressor module 106 may also be coupled to pulse wave modulation (PWM) logic module 107. In some embodiments, decompressor module 106 may receive compressed pixel data, decompress the received pixel data, and send it to PWM logic module 107.

Various data and control signal paths may couple PWM logic module 107, pixel clock generation module 181, driver circuit 108, printhead 109, mechanical controller 123, beam detect sensor 112 and transfer belt position sensor 125. In some embodiments, printhead 109 may be a laser printhead. In some embodiments, beam detect sensor 112 and/or belt position sensor 125 may each generate several signals for each scan line in an image, or for a set of scan lines in an image, or for each image and send the generated signals to mechanical controller 123, which then sends signals to PWM logic module 107.

Driver circuit 108 may be communicatively coupled to PWM logic module 107 and printhead 109. In some embodiments, scanning mirror 111 may be mechanically or electro-magnetically coupled to scanning motor 110, which may be used to rotate scanning mirror 111. Light from printhead 109 may be transmitted to scanning mirror 111 and scanning mirror 111 may reflect that light, at different times, to beam detect sensor 112 and beam-to-drum guide mirror 113. Beam-to-drum guide mirror 113 may reflect light from scanning mirror 111 to photosensitive drum 114. Drum charger 116 may be used to charge photosensitive drum 114.

Paper 175 may be passed from paper input tray 126 through transfer rollers 124 to transfer belt 117 where latent images from photosensitive drum 114 may be transferred to paper 175. In some embodiments, latent images from photosensitive drum 114 may be developed with toner at developing station 115 before transfer to paper 175. The transfer of images from photosensitive drum 114 to paper 175 may occur while paper 175 is on transfer belt 117. After the image has been transferred, paper 175 may be moved over paper path 118 using transfer rollers 124 and past fuser 119, guide rollers 121, and to paper output tray 122. In some embodiments, fuser 119 may facilitate the bonding of the transferred image to paper 175.

Exemplary print engine 150 of printer 100 may include beam detect sensor 112, beam-to-drum guide mirror 113, developing station 115, photosensitive drum 114, drum charger 116, scanning mirror 111, scanning motor 110, and printhead 109. Exemplary image electronics subsystem 160 may include CPU 103, image data I/O module 102, memory 104, DMA control module 105, data bus 170, decompressor module 106, PWM logic module 107, and driver circuit 108. The various modules and subsystems described above may be implemented by hardware, software, or firmware or by various combinations thereof.

In some embodiments, computer 101 may send image data to image electronics subsystem 160 over connection 120. The image data sent from the computer 101 may be compressed. In some embodiments, the compressed image data may be in a line-sequential compressed format. Various other formats such as Postscript, PCL, and/or other public or proprietary page description languages may also be used to transfer image data. After image data is received by image data I/O module 102, the image data may be placed in memory 104 using DMA control module 105 under the control of CPU 103. In some embodiments, when image data for a complete page has been stored in memory 104, a print sequence may be initiated. In some embodiments, mechanical controller 123 may initiate operations of scanning motor 110, photosensitive drum 114, and transfer belt 117 through appropriate data and/or control signals.

Beam detect sensor 112 can detect a laser beam's position and generate pulses that are sent to image electronics subsystem 160 so that image data can be properly aligned from line to line in a printed image. In some embodiments, at the beginning of a scan of each line of the image, light from the printhead 109 may be reflected by scanning mirror 111 onto beam detect sensor 112. Beam detect sensor 112 may signal mechanical controller 123 which, in turn, may send a beam detect signal 240 to PWM logic module 107. In some embodiments, a separate signal typically referred to as top of data (TOD) or "vsync" may also be generated by mechanical controller 123, based on information received from transfer belt position sensor 125. The TOD or vsync signal indicates when image data transfer can begin for paper 175. For example, in some embodiments, when paper 175 passes transfer belt position sensor 125, a TOD signal may be sent to PWM logic module 107 via mechanical controller 123. Once the TOD signal is received, CPU 103 may initiate a transfer from memory 104 to decompressor module 106. In some embodiments, decompressor module 106 may decompress image data and pass the resulting raw image data to PWM logic module 107. The resultant PWM pulses from PWM logic module 107 may then be streamed to driver circuit 108, which may then transmit the PWM pulses to printhead 109.

In some embodiments, laser light from printhead 109 may be pulsed and reflected off scanning mirror 111 and beam-to-drum guide mirror 113, causing a latent image of charged and discharged areas to be built up on photosensitive drum 114. In some embodiments, toner develops this latent image at the developing station 115 and the latent image may be transferred to transfer belt 117. For a multi-component image, such as a color image, the latent image building process may repeat for each of the components. For example, for CMYK color printers, which use cyan ("C"), magenta ("M"), yellow ("Y"), and black ("K"), the latent image building process on photosensitive drum 114 may be repeated for each of the colors C, M, Y, and K. In some embodiments, when all components have been assembled on transfer belt 117, paper 175 may be fed from paper input tray 126 to transfer roller 124 where the image may be transferred to paper 175. In some embodiments, fuser 119 may then fix the toner to paper 175, which is sent to paper output tray 122 using guide rollers 121.

Pixel clock generation module 181 may be a crystal oscillator or a programmable clock oscillator, or any other appropriate clock generating device. In some embodiments, such as in a "multi-pass" printer 100, which sends the video data for each color serially in sequence, the frequency of the clock generated by the pixel clock generation module 181 may be fixed among each pass of the printer. In an example multi-pass printer 100, the pixel clock generation module 181 may be a crystal oscillator. In another embodiment, such as a printer 100 that uses multiple sets of print engines 150, sometimes collectively referred to as a "tandem engine", the frequency of each channel may be calibrated if the frequencies differ among the pixel clocks corresponding to each of the color components. In such embodiments, one or more programmable clock oscillators may be used to allow for calibration.

Exemplary embodiments of printer 100 may include driver circuit 108 driving multiple sets of print engine 150, which may be connected to multiple printheads 109. In some embodiments, printheads 109 could all be laser printheads. There may also be a plurality of individual modules of image electronics subsystem 160. For example, a single decompressor module 106 may be connected to multiple PWM logic modules 107 with each PWM module 107 being connected to one or more pixel clock generation modules 181 and one or more driver circuits 108. Decompressor module 106 could provide each PWM logic module 107 with one or more color components of an image, which would then be sent to the multiple driver circuits 108 for onward transmission to one or more sets of print engine 150.

In other embodiments, multiple decompressor modules 106 may be coupled to multiple PWM logic modules 107. Each decompressor module 106 may provide a PWM logic module 107 with a decompressed component of the image. In other embodiments a single PWM logic module 107 could provide multiple components of the image to multiple driver circuits 108.

In some embodiments, printer 100 may have multiple lasers per laser printhead. In some embodiments, printhead 109 may receive multiple lines of data from driver circuit 108 and project the multiple lines of data to scanning mirror 111. Scanning mirror 111 may then reflect the multiple lines of data to beam detect sensor 112 and guide mirror 113, which may reflect the multiple lines to photosensitive drum 114. In some embodiments, the beam detect sensor 112 may detect a signal, such as a laser signal, reflected off of the scanning mirror 111, or may also detect multiple signals reflected off scanning mirror 111.

The coupling discussed herein may include, but is not limited to, electronic connections, coaxial cables, copper wire, and fiber optics, including the wires that comprise data bus 170. The coupling may also take the form of acoustic or light waves, such as lasers and those generated during radio-wave and infra-red data communications. Coupling may also be accomplished by communicating control information or data through one or more networks to other data devices. Mechanical or electro-mechanical coupling as used herein may include, but is not limited to, the use of physical components such as motors, gear coupling, use of universal joints, or any other mechanical or electro-mechanical device usable to couple items together.

Each of the logical or functional modules described above may comprise multiple modules. The modules may be implemented individually or their functions may be combined with the functions of other modules. Further, each of the modules may be implemented on individual components, or the modules may be implemented as a combination of components.

CPU 103, decompressor module 106, and PWM logic module 107 may each be implemented by a field-programmable gate array (FPGA), an application-specific integrated circuit (ASIC), a complex programmable logic device (CPLD), a printed circuit board (PCB), a combination of programmable logic components and programmable interconnects, single CPU chip, a CPU chip combined on a motherboard, a general purpose computer, or any other combination of devices or modules capable of performing the tasks of modules 103, 106 or 107. In some embodiments, memory 104 may comprise a random access memory (RAM), a read only memory (ROM), a programmable read-only memory (PROM), a field programmable read-only memory (FPROM), or other dynamic storage device, coupled to data bus 170 for storing information and instructions to be executed by image electronics subsystem 160.

Figure 2:
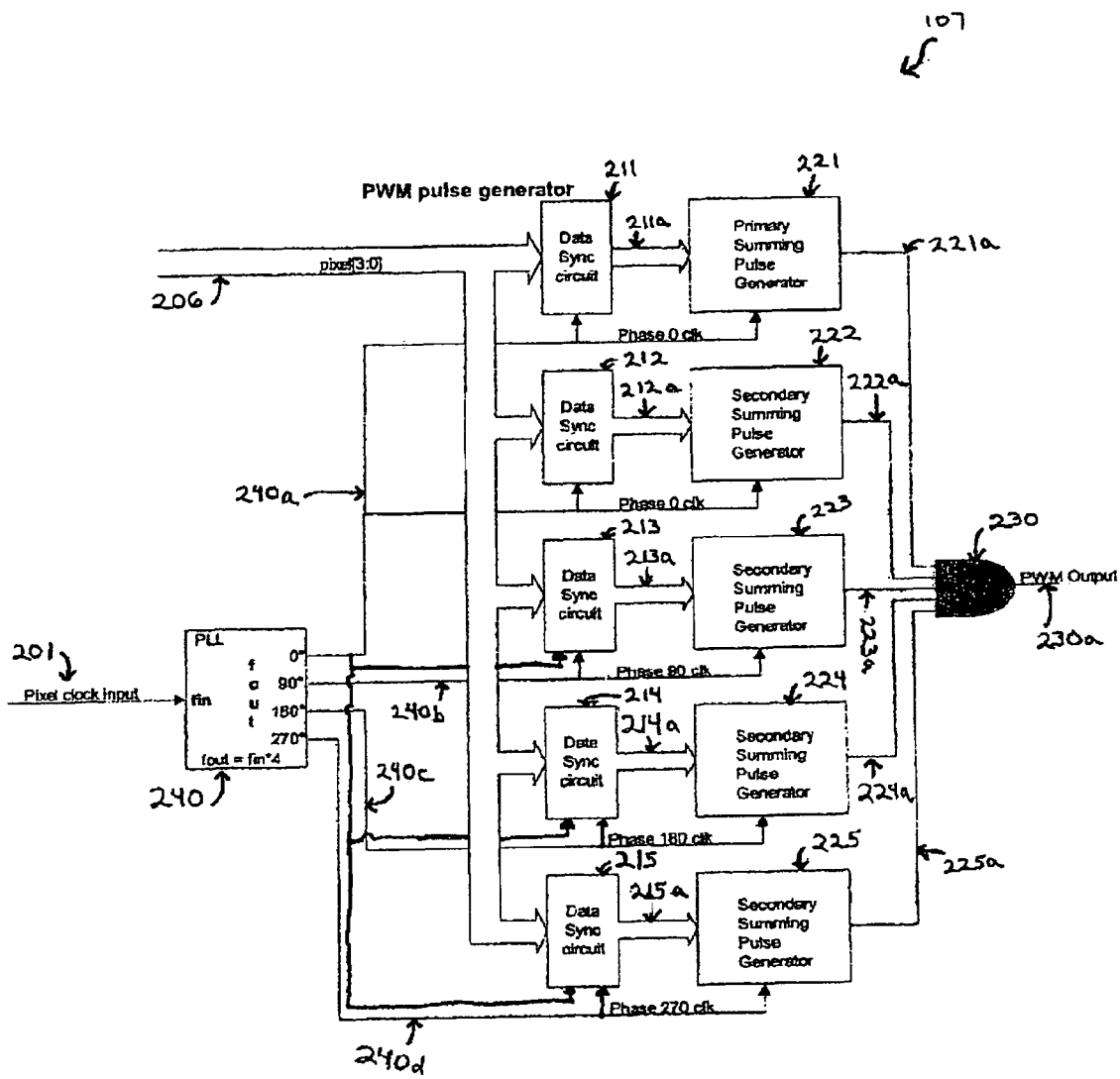
FIG. 2 shows a block diagram of an exemplary PWM pulse generator according to some embodiments of the present invention.

FIG. 2 shows a block diagram of an exemplary PWM logic module 107 according to some embodiments of the present invention. Exemplary PWM logic module 107 includes a plurality of data sync circuits 211, 212, 213, 214, and 215; primary summing pulse generator 221; a plurality of secondary summing pulse generators 222, 223, 224, and 225; logic gate 230; and phase lock loop (PLL) module 240. In exemplary PWM logic module 107, PLL module 240 may serve as a clock generating section. As shown in FIG. 2, PLL module 240 may be coupled to each of data sync circuits 211-215, primary summing pulse generator 221, and secondary summing pulse generators 222-225. Each of data sync circuits 211-215 may also be coupled to one of summing pulse generators 221-225, as shown in FIG. 2. In exemplary PWM logic module 107, the combination of data sync circuits 211-215, summing pulse generators 221-225, and logic gate 230 may serve as a pulse-width modulated signal generating section. Input pixel clock 201 and pixel data 206 may be input to exemplary PWM logic module 107, which outputs PWM output signal 230$a$. In some embodiments, pixel data 206 may consist of multiple bits of pixel data per clock cycle. For example, for exemplary PWM logic module 107 shown in FIG. 2, pixel data 206 is a four-bit number.

As shown in FIG. 2, pixel clock 201 may be input into PLL module 240, which outputs phase shifted clock signals 240$a$-$d$. Because each clock signal 240$a$-$d$ has a different phase, clock signals 240$a$-$d$ may be referred to as phase-differentiated clock signals. Exemplary phase shifted clock signals include phase0 clock 240$a$, phase90 clock 240$b$, phase180 clock 240$c$, and phase270 clock 240$d$. In some embodiments, PLL module 240 may output phase shifted clock signals having a frequency that is a multiple of the frequency of pixel clock 201. For example, in exemplary PWM logic module 107 shown in FIG. 2, each of phase shifted clock signals

240a-d has a frequency that is four times the frequency of pixel clock signal 201. Additionally, in some embodiments, the phase difference between successive phase shifted clock signals may be equal to 360° divided by the number of phase shifted clocks. For example, in exemplary PWM logic module 107 shown in FIG. 2 with four phase shifted clocks 240a-d, phase0 clock 240a is shifted by 0°, while phase90 clock 240b is phase shifted by 90°, phase180 clock 240c is phase shifted by an additional 90° to 180°, and phase270 clock 240d is phase shifted by a further 90° to 270°. Some embodiments may have more or less than four phase shifted clocks. PLL module 240 may be implemented using a phase locked loop ("PLL") in some embodiments.

As shown in FIG. 2, PLL module 240 is coupled to data sync circuits 211-215. Data sync circuits 211-215 may serve the function of synchronization circuits in some embodiments of exemplary PWM module 107 by synchronizing pixel data 206 with one of phase shifted clocks 240a-d. Data sync circuits 211-215 each receive phase0 clock 240a from PLL 240 and pixel data 206 as input. Further, data sync circuits 211-212 may be coupled to summing pulse generators 221-222, respectively, with a data offset of 0°. Data sync circuits 213-215 may each synchronize pixel data 206 with an additional phase shifted clock signal input. For example, in addition to phase0 clock signal 240a and pixel data 206, data sync circuit 214 also receives phase180 clock 240c from PLL module 240 as input. Data sync circuit 214 can synchronize pixel data 206 to the phase180 clock 240c, which has a 180° phase shift. Similarly, data sync circuits 213 and 215 may also synchronize pixel data 206 with phase90 clock 240b and phase270 clock 240d, respectively.

Exemplary PWM logic module 107 may use the 0° offset of pixel clock 201 as a primary domain for the output of primary summing pulse generator 220. In some embodiments, a phase shifted clock signal input to primary summing pulse generator 220, such as exemplary signal 240a, may not be input to any of secondary summing pulse generators 212-215. In some embodiments, synchronized pixel data 211a-215a output from data sync circuits 211-215, respectively, may be input into summing pulse generators 221-225, respectively.

Figure 3A:
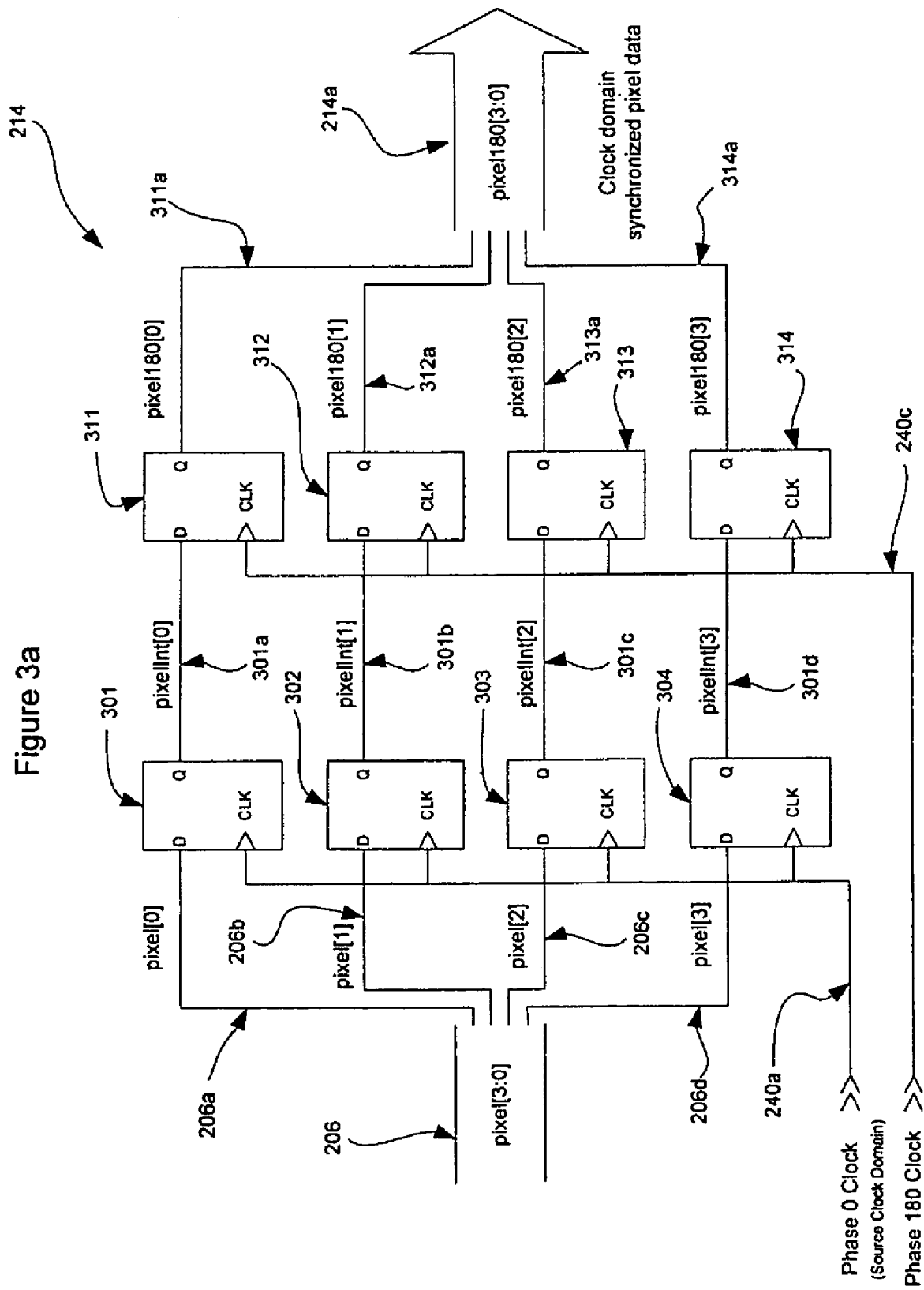
FIG. 3a shows a diagram of an exemplary data sync circuit according to some embodiments of the present invention.

FIG. 3a shows a diagram of exemplary data synchronization circuit 214 according to some embodiments of the present invention. In some embodiments, data sync circuits 211, 212, 213, and 215 may also use similar, appropriately modified data sync circuits, as that shown in FIG. 3a. Exemplary data sync circuit 214 shown in FIG. 3a includes D flip flops 301-304 and 311-314. Data sync circuit 214 accepts phase0 clock 240a, phase180 clock 240b, and pixel data 206 as inputs. Data sync circuit 214 outputs synchronized180 pixel data 214a synchronized to phase180 clock 240c. In some embodiments, data sync circuit 214 can be implemented by an FPGA, an application-specific Integrated Circuit (ASIC), a complex programmable logic device (CPLD), a printed circuit board (PCB), a combination of programmable logic components and programmable interconnects, or any other appropriate combination of devices or modules capable of performing functions of the data sync circuit.

Exemplary data sync circuit 214 shown in FIG. 3a may break input pixel data 206 into its four constituent bit lines 206a-d, respectively. For example, bit line 206a may carry the least significant pixel bit, bit 0; bit line 206b may carry bit 1; bit line 206c may carry bit 2; and bit line 206d may carry bit 3. Bit lines 206a-d may be input into corresponding flip-flops 301-304, respectively. In exemplary data sync circuit 214 shown in FIG. 3a, when phase0 clock 240a has a rising edge, flip-flop 301 captures the input on its D gate corresponding to the signal on bit line 206a. After the flip-flop delay, flip-flop 301 outputs the captured signal onto its Q-gate. The Q-gate for flip-flop 301 is connected to intermediate bitline 301a, which is input into the D-gate of flip-flop 311. When phase180 clock 240c has a rising edge, flip-flop 311 captures the signal on intermediate bitline 301a. Again, after the flip-flop delay, flip flop 311 may output the captured signal onto its Q-gate, which is connected to output bitline 311a. Because flip-flop 311 captures and outputs data according to the rising edge of phase180 clock 240c, the signal output onto output bitline 311a can be synchronized to phase180 clock 240c. Similarly, synchronized output bitlines 312a-314a may be synchronized to phase0 clock 240a, phase90 clock 240b, and phase270 clock 240d, respectively. In some embodiments, output bitlines 311a, 312a, 313a, and 314a may then be combined into synchronized180 pixel data 214a.

Figure 3B:
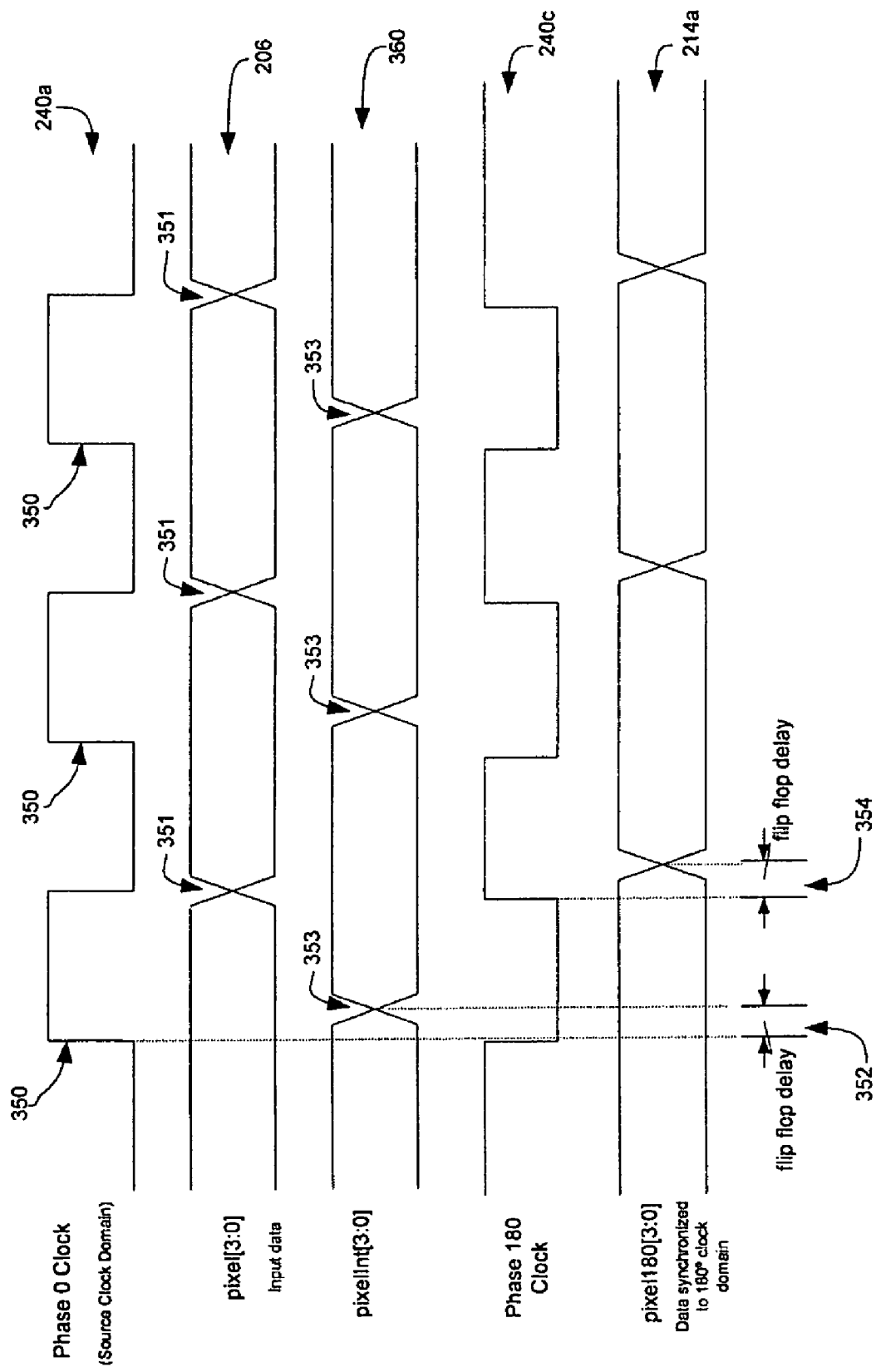
FIG. 3b shows a timing diagram of the exemplary data sync circuit of FIG. 3a according to some embodiments of the present invention.

FIG. 3b shows a timing diagram of the exemplary data sync circuit of FIG. 3a according to some embodiments of the present invention. Timing diagram 3b shows phase0 clock 240a, input pixel data 206, intermediate pixel signal 301, phase180 clock 240c, and synchronized pixel signal 214a. As shown in the timing diagram, input pixel data 206 is captured at rising edge 350 of phase0 clock 240a. Although input pixel data 206 is shown as changing at points 351 when phase clock 240a has a downward edge, input pixel data 206 can change at any time during a pulse of phase0 clock 240a as long as the current pixel data is captured by flip-flops 301-304. After flip-flop delay 352, the captured signals are output as intermediate pixel data 360. Then, intermediate pixel data 360 is captured at the rising edge 353 of phase180 clock 240c. After flip-flop delay 354, this captured data is output as synchronized pixel data 214a.

In some embodiments of PWM module 107, data sync circuits 211, 212, 213, and 215 may operate in a fashion similar to data sync circuit 214. Accordingly, timing diagrams for data sync circuits 211-213 and 215 are similar to FIG. 3b except in that the phase shifted clock, and the corresponding synchronized pixel data, are offset by a different phase. Thus, for example, synchronized pixel data 213a is offset by 90°; and synchronized pixel data 215a is offset by 270°. Synchronized pixel data 211a and 212a have a 0° offset and may be input into a similar data sync circuit so that synchronized pixel data 211a and 212a are delayed by an equivalent amount as pixel data in the 90°, 180°, and 270° domains.

Delay 352 represents the total time for setup, hold, and flip-flop delay. As shown in the timing diagram of FIG. 3b, delay 352 may be designed to be less than the lowest skew between phase0 clock 240a and any of phase90 clock 240b, phase180 clock 240c, and phase270 clock 240d to ensure the integrity of the output of flip-flops 301-304. As an example, for an operating frequency of 245 MHz or lower with 4 clock domains using the exemplary data sync circuit of FIG. 3a, the total delay can be $[(1/4)*(1/245 \text{ MHa})]$ or 1.02 ns. Accordingly, the circuits may be designed using a XILINX SPARTAN 3 FPGA. The XILINX SPARTAN 3 FPGA has setup, hold, and flip-flop delay times of 0.42 ns, 0.6 ns, and 0 ns, for a total delay of 1.02 ns, which meets design parameters.

FIG. 4a shows a diagram of an exemplary primary summing pulse generator 221 according to some embodiments of the present invention. In some embodiments, output 211a of data sync circuit 211 may be input to primary summing pulse generator 221. Primary summing pulse generator 221 may generate primary summing pulse output 221a and receive synchronized pixel data 211a and phase0 clock 240a as input. As shown in FIG. 4a, synchronized pixel data 211a consists of the four-bit hexadecimal number 0xA. FIG. 4a shows active gates used in generating primary summing pulse output 460a for the input of 0xA. The operation of memory gates to generate output 460a may vary based on the value of synchronized pixel data 211a. In some embodiments, primary summing pulse generator 221 includes counter 410, demultiplexer 420, demultiplexer 430, and logic gates 440, 450, and 460.

Figure 4B:
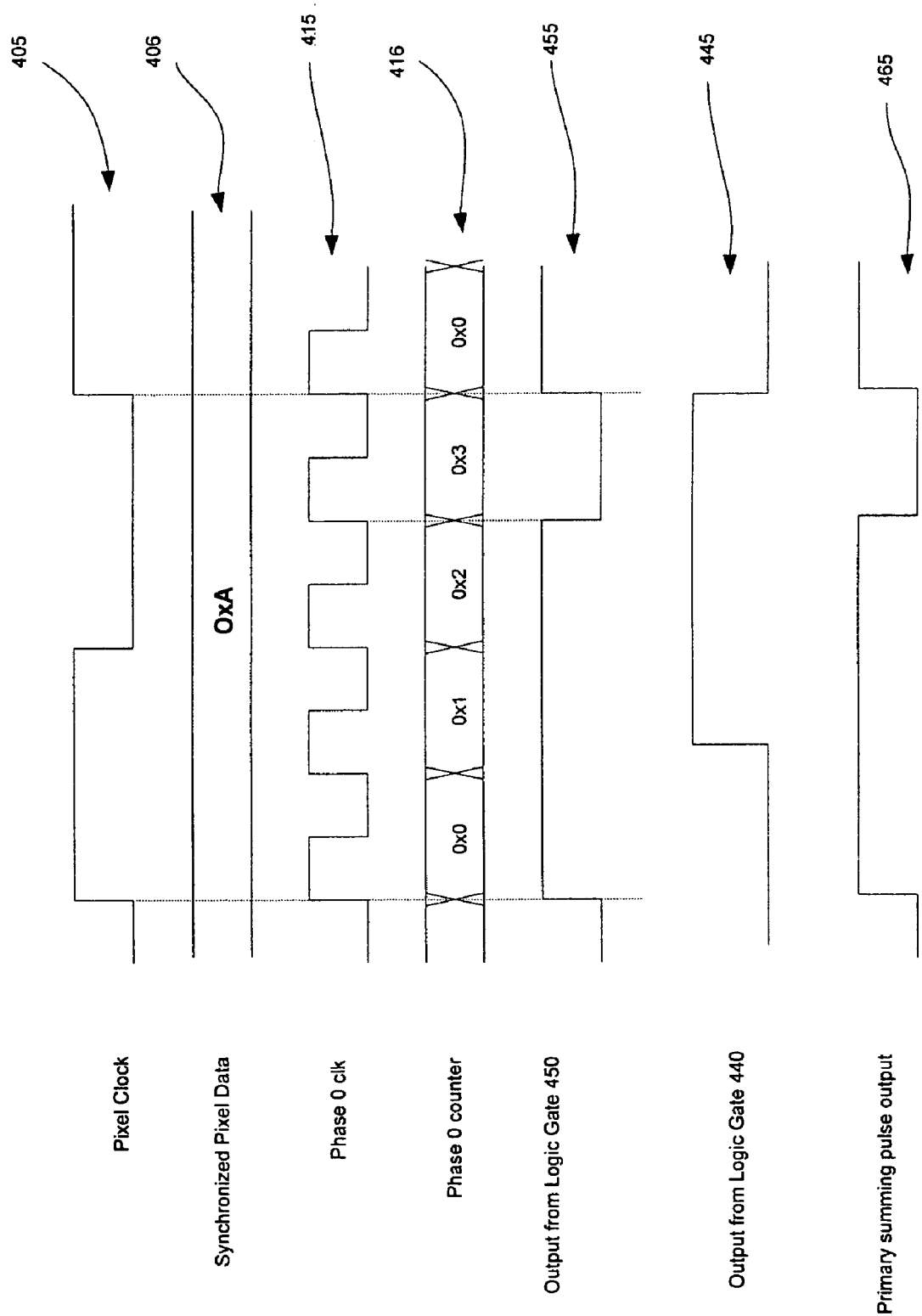
FIG. 4b shows a timing diagram of the exemplary primary summing pulse generator of FIG. 4a according to some embodiments of the present invention.

FIG. 4b shows a timing diagram for the exemplary primary summing pulse generator of FIG. 4a. FIG. 4b shows pixel clock 405, synchronized pixel data 406, phase0 clock 415, phase0 counter 416, output signal 455 from logic gate 450, output signal 445 from logic gate 440, and primary summing pulse output 465.

In some embodiments, counter 410 is coupled to demultiplexer 420 and receives phase0 clock 240a from PLL module 240 as input. Counter 410 outputs a two bit number on connections 410a and 410b to demultiplexer 420. As shown in FIG. 4b, counter 410 may increment the two-bit number carried on connections 410a and 410b on each pulse of phase0 clock 240a. As shown in FIG. 4b, phase0 clock 415 represents the signal for phase0 clock 240a. Phase0 counter 416 represents the output of counter 410. As shown in the timing diagram of FIG. 4b, phase0 counter 416 increments at each rising edge of phase 0 clock 415 until it reaches the value of 0x3. At this point, phase 0 counter 416 returns to the value 0x0 to start incrementing again. Accordingly, phase 0 counter 416 increments from 0x0 to 0x3 during one cycle of pixel clock 405. One of connections 410a and 410b carries the most significant bit from counter 410 while the other carries the least significant bit. The determination of the bit ordering of 410a and 410b may be implementation specific and may depend on the output connections of counter 410. Counter 410 shown in FIG. 4a is exemplary and for descriptive purposes only. Those skilled in the art will appreciate that embodiments of counter 410 include counters that output more than two bits and/or count to higher values.

As shown in FIG. 4a, demultiplexer 420 is coupled to counter 410 and logic gate 450. In this embodiment, demultiplexer 420 receives connections 410a and 410b from counter 410 as inputs and activates one of connections 420a-d with a logical high value based on the input received on connections 410a and 410b. Connection 420a is activated when demultiplexer 420 receives 0x0 as input on connections 410a and 410b; connection 420b is activated when demultiplexer 420 receives 0x1, connection 420c is activated when demultiplexer 420 receives 0x2, and connection 420d is activated when demultiplexer 420 receives 0x3. Demultiplexer 420 shown in FIG. 4a is exemplary and for descriptive purposes only. Those skilled in the art will appreciate that embodiments of counter 420 include demultiplexers that may accept more than two inputs and demultiplexers that may output more than four outputs.

Logic gate 450 is coupled to logic gate 460 and demultiplexer 420 and receives connections 420a-c from demultiplexer 420 as input. Logic gate 450 may output a logical high value on output 450a when any of inputs 420a-c is activated by demultiplexer 420. Correspondingly, when input 420d is activated by demultiplexer 420, logic gate 450 outputs a logical low value on connection 450a. Accordingly, as shown in the timing diagram of FIG. 4b, output signal 455 has a logical high value when counter 410 outputs values 0x0-0x2 to demultiplexer 420. When counter 410 outputs value 0x3 to demultiplexer 420, activating line 420d, output signal 455 has a logical low value. Although logic gate 450 is shown as a logical OR gate, those skilled in the art will appreciate that other logic gates may be appropriately used based on design considerations applicable to primary summing pulse generator 220. The output of logic gate 450 is received by logic gate 460.

Referring again to FIG. 4a, demultiplexer 430 is coupled to logic gate 440 by connections 430a-d and receives synchronized pixel data 400 from data sync circuit 211 as input. Demultiplexer 430 can receive multiple bits of data from synchronized pixel data 211a during one pixel clock cycle. As shown in FIG. 4a, synchronized pixel data 211a can carry four-bits of data representing numbers from 0x0 to 0xF. Demultiplexer 430 activates one of connections 430a-d according to the input received on synchronized pixel data 211a. As shown in FIG. 4a, synchronized pixel data 211a carries the binary representation of the hexadecimal number 0xA, (1010). Demultiplexer 430 uses this input to activate connection 430b, corresponding to the output for port A. Those skilled in the art will appreciate that demultiplexer 430 may be coupled to other logic gates besides logic gate 440. For example, in some embodiments, the outputs of demultiplexer 430 for 0x1-0x4 may be connected to one logic gate, outputs 0x5-0x8 to a second logic gate, 0x9-0xC to a third logic gate, and 0xD-0xF to a fourth logic gate. In some embodiments, primary summing pulse generator 420 may contain additional circuitry to accommodate the output of additional logic gates so that the correct signal will be output on primary summing output connection 460a. Additionally, those skilled in the art will appreciate that in some embodiments, demultiplexer 430 can accept as input more or less than the four bit input of synchronized pixel data 211a shown in the exemplary circuit of FIG. 4a. In some embodiments, the number of output connections on demultiplexer 430 may also be adjusted to accommodate the number of inputs of synchronized pixel data 211a.

Referring to FIG. 4b, synchronized pixel data 406 may not change during a cycle of pixel clock 405. For example, in the embodiment shown in FIG. 4a, synchronized pixel data 406 stays at the signal level corresponding to 0xA during a cycle of pixel clock 405. Because one cycle of pixel clock 405 lasts for the duration of phase0 counter 416 incrementing from 0x0 to 0x3, synchronized pixel data 406 maintains signal 0xA for this entire period. Accordingly, the input to demultiplexer 430 does not change during this period. As a result, demultiplexer 430 continues to output a logical high signal on line 430b that is fed to logic gate 440, as phase 0 counter increments from 0x0 to 0x3.

As shown in FIG. 4a, logic gate 440 is coupled to demultiplexer 430 and logic gate 460. Exemplary logic gate 440 produces a logical high signal on connection 440a when any of connections 430a-d is activated by demultiplexer 430. Accordingly, exemplary logic gate 440 produces a logical high signal on connection 440a when line 430b has been activated. Referring to FIG. 4b in which synchronized pixel data 406 holds value 0xA, line 430b will be activated for the entire duration of the pulse of pixel clock 405. Accordingly, output signal 445 on connection 440a will remain high for the entire duration of the pulse of pixel clock 405. Those skilled in the art will appreciate that the other outputs of demultiplexer 430 can be used as inputs to similar logical gates (not shown). Those skilled in the art will also appreciate that other configurations of logic gates can be used based on design considerations and the specific implementation of primary summing pulse generator 221.

As shown in FIG. 4a, logic gate 460 is coupled to logic gates 440 and 450, receives the output of logic gate 440 and logic gate 450 as input, and uses the input signals to produce output 460a. Because exemplary logic gate 460 is an AND gate, it will produce a logical high signal when both the connections 440a and 450a have a logical high signal. As shown in the timing diagram of FIG. 4b, output signal 455 on connection 450a maintains a logical high signal as phase 0 counter 416 cycles between 0x0 and 0x2. Output signal 445 on connection 440a maintains a logical high signal as phase0 counter 416 cycles between 0x0 and 0x3. Accordingly, logic gate 460 outputs a logical high signal on connection 460a as phase0 counter 416 cycles from 0x0 to 0x2. When phase0 counter 416 increments to 0x3, the output signal 455 of logic gate 450 changes to a logical low value. As a result, primary summing pulse output 465 on connection 460a of logic gate 460 also changes to a logical low value at this time, as seen in FIG. 4b. Those skilled in the art will also appreciate that other configurations of logic gates can be used based on design considerations and the specific implementation of primary summing pulse generator 221.

Different devices can be used to implement a primary summing pulse generator. For example, an FPGA, an application-specific integrated circuit (ASIC), a complex programmable logic device (CPLD), a printed circuit board (PCB), a combination of programmable logic components and programmable interconnects, or any other combination of devices or modules capable of performing the tasks of a primary summing pulse generator can be used.

FIG. 5a shows a diagram of exemplary secondary summing pulse generator 224 according to some embodiments of the present invention. In some embodiments, appropriately modified circuits, similar to that shown in FIG. 5a, may be used for secondary pulse generators 222, 223, and 225. FIG. 5a shows active gates used in generating phase180 summing pulse output 540a, for an input of 0xA. The output of data sync circuit 214 is received by phase180 summing pulse generator 224. Phase180 summing pulse generator 224 receives 0xA as synchronized pixel data 214a. Other gates (not shown) may be used in a similar manner to create phase180 summing pulse output 540a when pixel data 214a differs from 0xA. Phase180 summing pulse generator 224 includes counter 510, demultiplexer 520, demultiplexer 530, and logic gate 540.

Figure 5B:
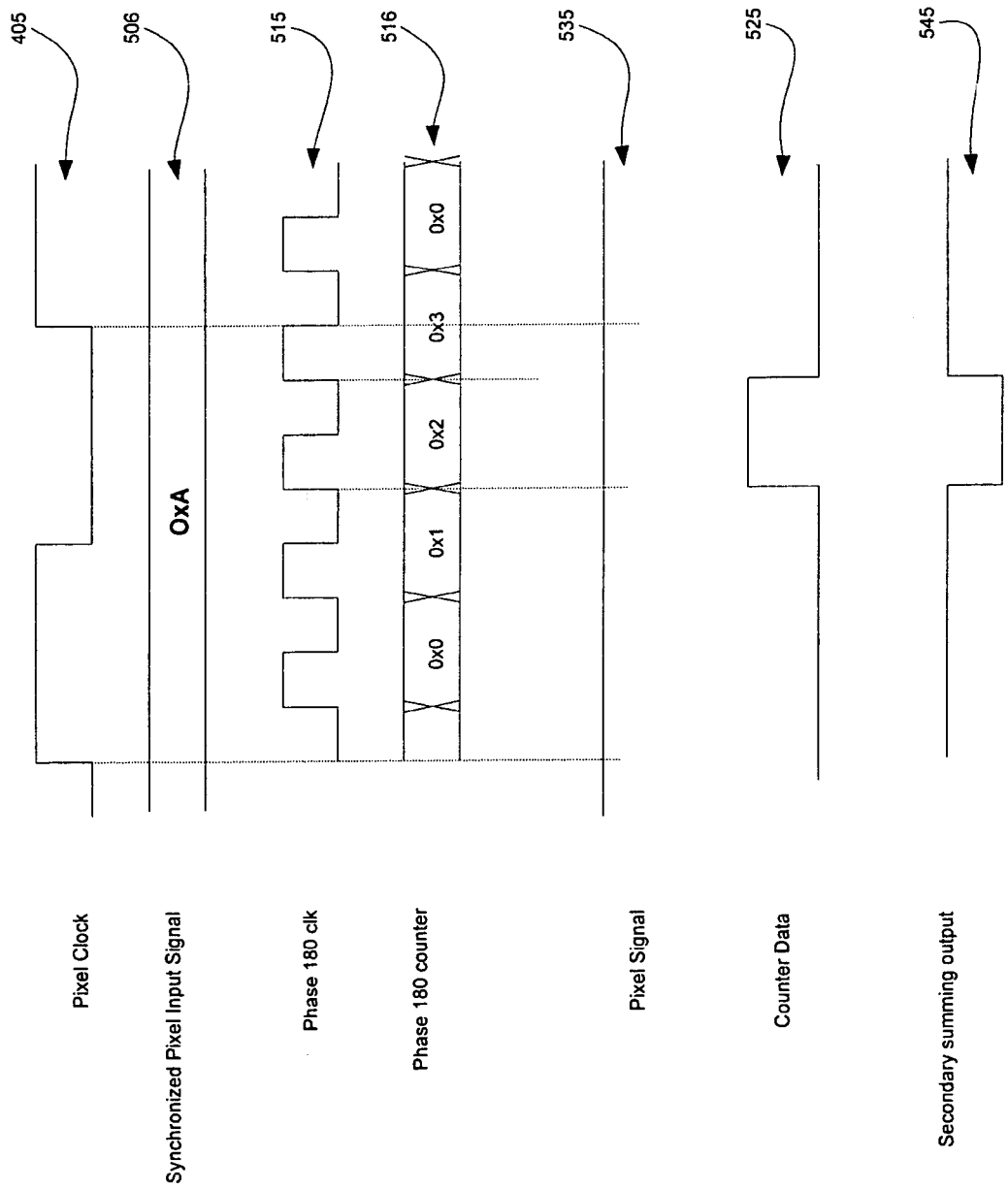
FIG. 5b shows a timing diagram of the exemplary secondary summing pulse generator of FIG. 5a according to some embodiments of the present invention.

FIG. 5b shows a timing diagram of exemplary secondary summing pulse generator 224 of FIG. 5a according to some embodiments of the present invention. FIG. 5b shows pixel clock 405, synchronized pixel input signal 506, phase180 clock 515, phase 180 counter 516, counter signal 525, pixel signal 535, and secondary summing output 545.

Counter 510, which is coupled to demultiplexer 520, receives phase180 clock 240c from PLL module 240 as input and outputs a two bit number on connections 510a and 510b to demultiplexer 520. As shown in FIG. 5a, counter 510 increments the two-bit number carried on connections 510a and 510b upon receiving a pulse on phase180 clock 240c. As shown in FIG. 5b, phase 180 clock 515 represents the signal carried by phase180 clock 240c, and phase180 counter 516 represents the output of counter 510. As shown in FIG. 5b, phase180 counter 516 increments at each rising edge of phase180 clock 515 until it reaches the value of 0x3. At this point, phase180 counter 516 returns to the value 0x0 to start incrementing again. One of connections 510a and 510b carries the most significant bit from counter 510 and the other carries the least significant bit. The determination of the bit ordering of connections 510a and 510b may be implementation specific and/or may depend on the output connections of counter 510. Those skilled in the art will appreciate that embodiments of counter 510 include counters that output more than two bits and/or count to higher values.

As shown in FIG. 5a, demultiplexer 520 is coupled to counter 510 and logic gate 540. In this embodiment, demultiplexer 520 receives connections 510a and 510b from counter 510 as inputs and activates one of connections 520a-d with a logical high value based on the input received on connections 510a and 510b. Connection 520a is activated when demultiplexer 520 receives 0x0 as input on connections 510a and 510b; connection 520b is activated when demultiplexer 520 receives 0x1; connection 520c is activated when demultiplexer 520 receives 0x2; and connection 520d is activated when demultiplexer 520 receives 0x3. In some embodiments, demultiplexer 520 accepts an increased number of connections coming from counter 510. Demultiplexer 520 shown in FIG. 5a is exemplary and for descriptive purposes only. Those skilled in the art will appreciate that embodiments of counter 420 include demultiplexers that may accept more than two inputs and demultiplexers that may output more than four outputs.

As shown in FIG. 5a, demultiplexer 530 is coupled to logic gate 540 by connection 530a and receives synchronized pixel data 214a from data sync circuit 214 as input. Demultiplexer 530 can receive multiple bits of data in synchronized pixel data 214a during one pixel clock cycle. As shown in FIG. 5a, synchronized pixel data 214a can carry four-bits of data to represent a number from 0x0 to 0xF. Demultiplexer 530 activates one of the connections according to the input received on synchronized pixel data 214a. As shown in FIG. 5a, synchronized pixel data 214a carries the binary representation of the hexadecimal number 0xA (1010). Demultiplexer 530 uses this input to activate connection 530a, corresponding to port A on demultiplexer 530. Those skilled in the art will appreciate that demultiplexer 530 may be coupled to more logic gates than logic gate 540. For example, in some embodiments, the output connections for each of 0x0-0x9 and 0xB-0xF may each be connected to one logic gate that functions similarly to logic gate 540. Phase180 summing pulse generator 223 may contain additional circuitry to accommodate the output of these additional logic gates so that the correct signal will be output on connection 540a. Additionally, those skilled in the art will appreciate that in some embodiments, demultiplexer 530 may accept as input more or less than the four bit input of synchronized pixel data 214a shown in the exemplary circuit of FIG. 5a. In some embodiments, the number of output connections on demultiplexer 530 may also be adjusted to accommodate the number of inputs of synchronized pixel data 214a.

Referring to FIG. 5b, synchronized pixel input signal 506 may not change for the duration of phase180 counter 516 incrementing from 0x0 to 0x3. For example, in the embodiment shown in FIG. 5a, synchronized pixel input signal 506 stays at the signal level corresponding to 0xA while phase180 counter 516 increments from 0x0 to 0x3. As a result, demultiplexer 530 outputs a logical high value on line 530a that is fed to logic gate 540 for the period that 0xA is input into demultiplexer 530.

As shown in FIG. 5a, logic gate 540 is coupled to demultiplexer 520 and demultiplexer 530 and receives the output of demultiplexer 520 on connection 520c and the output of demultiplexer 530 on connection 530a as inputs. Logic gate 540 uses the signals from on connections 520c and 530a to produce the output signal on connection 540a. Because logic gate 540 is a NAND gate, it will produce a logical low signal when both the connections 520c and 530a have a logical high signal. Otherwise, logic gate 540 will produce a logical high signal. As shown in the timing diagram of FIG. 5b, secondary summing output 545 on connection 540a maintains a logical high signal as phase180 counter 516 increments from 0x0 to 0x1. During this period, pixel signal 535 on connection 530a maintains a logical high signal. Further, counter signal 525 on connection 520c maintains a logical low connection as phase180 counter 516 increments from 0x0 to 0x1. When phase180 counter increments to 0x2, signal 525 on connection 520c is activated to be a logical high value while connection 530a continues to carry a logical high signal. Accordingly, because connections 520c and 530a both carry logical high signals at this time, logic gate 540 outputs a logical low signal on connection 540a when phase180 counter 516 is at 0x2. As phase180 counter increments to 0x3, the signal on connection 520c returns to a logical low value while secondary summing output 545 on connection 540a returns to a logical high value, as seen in FIG. 5b. Those skilled in the art will also appreciate that other configurations of logic gates can be used based on design considerations and the specific implementation of the secondary summing pulse generators used in this circuit.

Figure 5C:
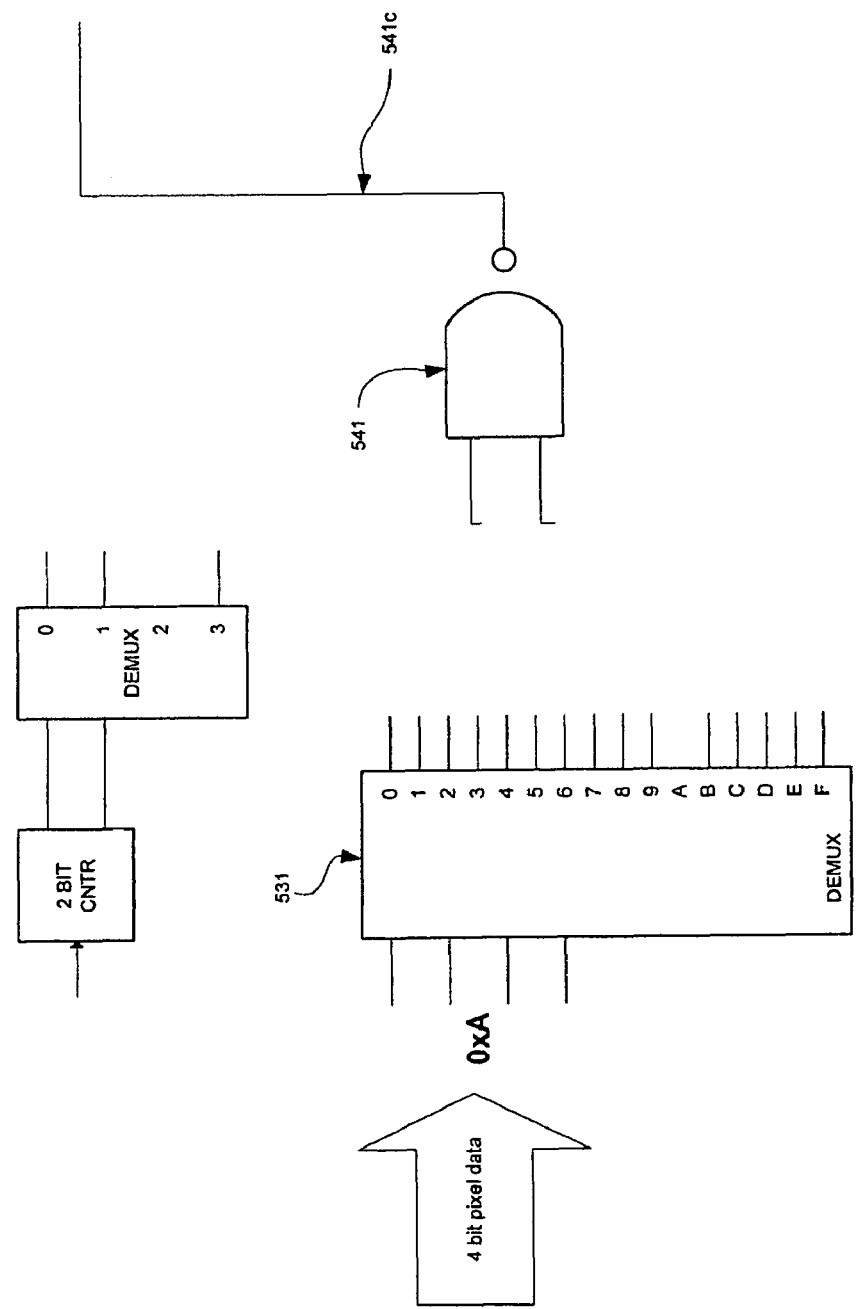
FIG. 5c shows an exemplary embodiment of the components for summing pulse generators 222, 223, and 225, without connections.

When synchronized pixel data 212a, 213a, and 215a are input into phase0 summing pulse generator 222, phase90 summing pulse generator 223, and phase270 summing pulse generator 225, respectively, the outputs for these summing pulse generators will remain high when input pixel data 206 corresponds to 0xA. FIG. 5c shows an exemplary embodiment of the components for summing pulse generators 222, 223, and 225, without connections. As shown in FIG. 5c, summing pulse generators 222, 223, and 225 may each have individual demultiplexers 531 and logic gate 541. In some embodiments, the individual demultiplexers 531 and logic gates 541 may perform functions similar to that performed by demultiplexer 530 and logic gate 540 for phase180 summing pulse generator 224. As seen in FIG. 5c, summing pulse generators 222, 223, and 225 do not have a connection from the A gate of their corresponding individual demultiplexer 531 that is fed to their corresponding logic gate 541. As a result, the input into the logic gates 541 will be low when pixel data 206 carries the value 0xA and may stay low for the duration of the pulse shifted pixel clock. In FIG. 5c, because logic gates 541 are implemented using NAND gates and at least the one input coming from demultiplexer 531 remains at a logical low value while 0xA is input, logic gates 541 will output high signals on their respective outputs while pixel data 206 carries the value 0xA.

Different devices can be used to implement secondary pulse summing generators. For example, an FPGA, an application-specific integrated circuit (ASIC), a complex programmable logic device (CPLD), a printed circuit board (PCB), a combination of programmable logic components and programmable interconnects, or any other combination of devices or modules capable of performing the tasks of a secondary summing pulse generator can be used.

Figure 6A:
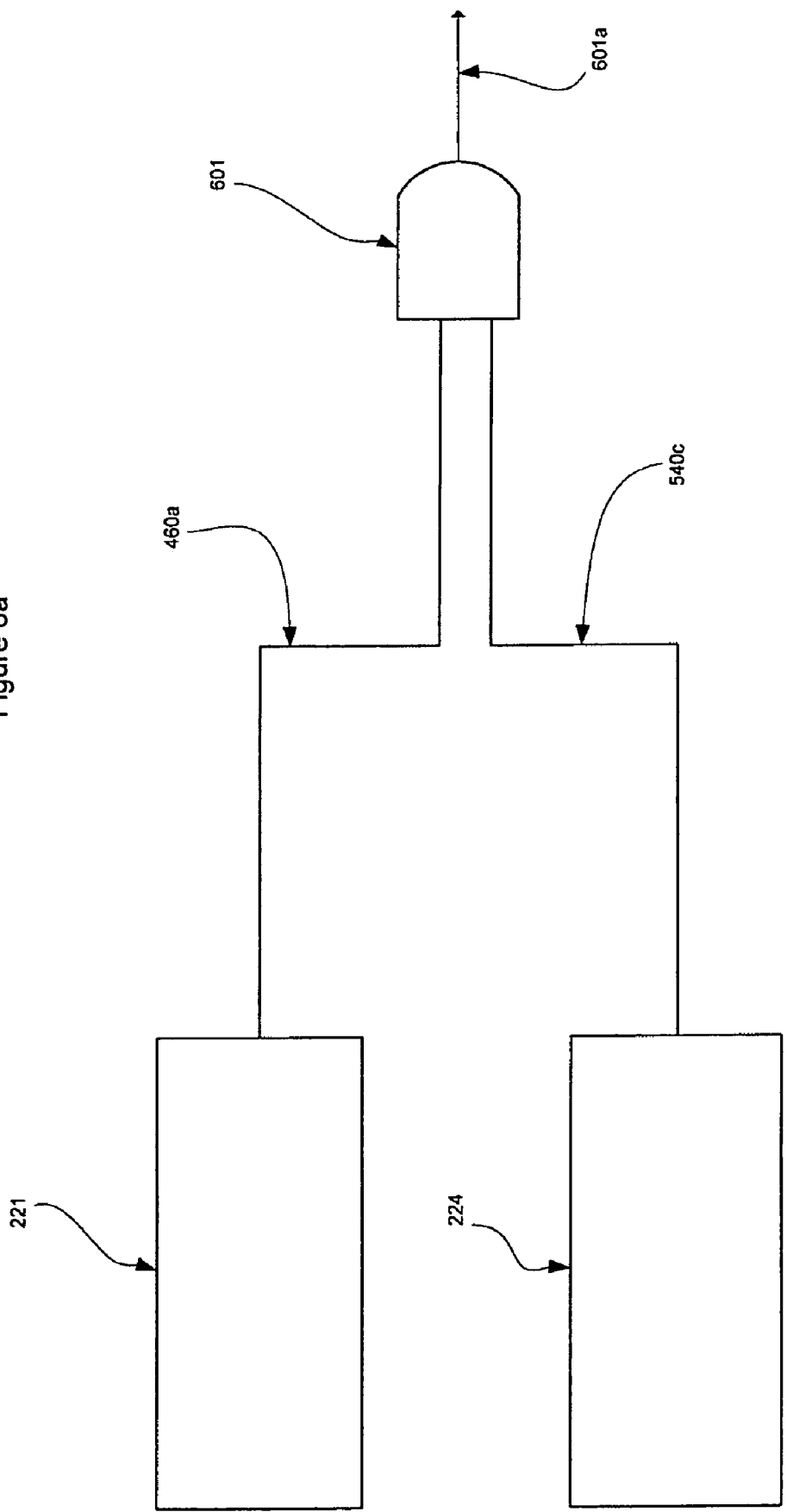
FIG. 6a shows a block diagram illustrating an exemplary embodiment of the connection between a primary summing pulse generator and one of the secondary summing pulse generators according to some embodiments of the present invention.

FIG. 6a shows a block diagram illustrating an exemplary embodiment of the connection between a primary summing pulse generator and one of the secondary summing pulse generators according to some embodiments of the present invention. As shown in FIG. 6a, both primary summing pulse generator 221 and phase180 summing pulse generator 224 are coupled to logic gate 601. In the embodiment shown in FIG. 6a, logic gate 601 is implemented using an AND gate and accepts output 460a of primary summing pulse generator 221 and output 540a of phase180 summing pulse generator 224 as inputs. Logic gate 601 outputs intermediate summing pulse output 601a.

FIG. 6b shows a timing diagram for an exemplary embodiment of a primary summing pulse generator and one of the secondary summing pulse generators according to some embodiments of the present invention. FIG. 6b shows timing diagrams for pixel clock 405, pixel data 406, phase0 clock 415, phase0 counter 416, primary summing output 465, phase180 clock signal 515, phase180 counter 516, phase180 summing output 545, and intermediate PWM output 605.

As shown in FIG. 6b, phase180 clock 515, phase180 counter 516, and phase180 summing output 545 are offset from the signals of the primary summing pulse generator by 180°. Primary summing output 465 and phase180 summing output 545 are input into logic gate 601, which is an AND gate. Thus, output 601a of logic gate 601 is high when both primary summing output 465 and phase180 summing output 545 are high. As shown in FIG. 6b, primary summing pulse output 465 on connection 460a remains high as phase0 clock 415 increments from 0x0 to 0x2. Phase180 summing pulse output 545 remains high as phase180 counter 516 cycles from 0x0 to 0x1. Thus, intermediate PWM output 605 on connection 601a is a logical high value during the time that phase180 counter 516 increments from 0x0 to 0x1. Intermediate PWM output 605 produces a low logical signal during the period when phase180 summing output 545 also produces a low signal, which occurs when phase180 counter 516 increments to 0x2. As shown in FIG. 6b, intermediate PWM output 605 remains a logical high value for $^{10}/_{16}$ ths of a pulse width. Phase180 summing pulse output 545 returns to a logical high value when phase180 counter outputs 0x3; but at this time, primary summing pulse output 465 has already gone to a logical low state. Thus, in this embodiment, intermediate PWM output remains as a logical low value.

As shown in FIG. 2, the outputs 222a, 223a, and 225a, from the remaining summing pulse generators 222, 223, and 225, respectively, are then input into logic gate 210, along with intermediate PWM output 601a. As described above, in this embodiment, outputs 222a, 223a, and 225a will remain high for the entire time that 0xA is the value of input pixel data 206. Because logic gate 230 is an AND gate in this embodiment and outputs 222a, 223a, and 225 remain high for the value 0xA, output 230a of PWM module 107 produces a logical high value as long as intermediate PWM output 601a remains as a logical high value. In this embodiment, with 0xA as the input pixel data, intermediate output 601a remains high for $^{10}/_{16}$ ths of a pixel clock pulse. Accordingly, output 230a produces a signal that is $^{10}/_{16}$ ths of the width of a pulse of pixel clock 201. The pulse width resolution of the output signal equals the smallest pulse interval possible in a specific configuration. Accordingly, the pulse width resolution of this embodiment equals $^{1}/_{16}$ th of the width of a pulse of the base pixel clock. Further, the frequency corresponding to this pulse width resolution is 16 times the frequency of the pixel clock. Those skilled in the art will realize that other embodiments may have a frequency for the pulse width resolution that is greater or lesser than 16 times the frequency of the pixel clock.

In general, the frequency corresponding to a specific pulse width resolution may equal an integer multiple of the frequency of the base pixel clock. In some embodiments, the integer multiple may equal a product of the multiple by which the output frequency of phase shifted clocks 240a-d from PLL module 240 exceeds the frequency of pixel clock 201 and the number of pulses in any of phase shifted clocks 240a-d in one pulse of pixel clock 201. In some embodiments, the integer multiple may equal a product of the multiple by which the output frequency of phase shifted clocks 240a-d from PLL module 240 exceeds the frequency of pixel clock 201 and the number of secondary summing pulse generators 222-225. In exemplary PWM module 107, the frequency of phase shifted clocks 240a-d equals four times the frequency of pixel clock 201; further, each phase shifted clock has four pulses for every one pulse of pixel clock 201. Accordingly, the pulse width resolution in exemplary PWM module 107 has a frequency equal to 16 times the frequency of pixel clock 201 with a pulse width resolution of 1/16 th of the width of pixel clock 201. Those skilled in the art will realize that a corresponding frequency for a specific pulse width resolution may also be more or less than 16 times the frequency of an input signal.

As can be seen in FIG. 6b, intermediate PWM output produces output 605 that is 10/16 ths of the width of a pulse of pixel clock 405 provided that phase180 summing output 545 is producing a logical high value when phase180 counter 516 is outputting 0x3 for the previous pixel value, corresponding to time period 655. If phase180 summing output 545 produces a logical low value at time period 655, however, then intermediate PWM output 605 begins in a logical low state. For example, if intermediate PWM output 605 of the previous pixel was 14/16 ths of a pixel clock 201 pulse width, then phase180 summing output 545 is in a low state at the point when phase180 counter 516 is at 0x3 for the previous pixel. If phase180 summing output 545 is in a low state at the point when phase180 counter 516 is at 0x3 for the previous pixel, this may interfere with the output for the current pixel. Accordingly, some embodiments may have dual PWM modules 107 processing alternate pixel data in parallel. Accordingly, one PWM module 107 processes one pixel data value and the other PWM module 107 processes the immediately successive pixel data value. In the period between processed pixel data values in each PWM module 107, data may be input such that each of secondary summing pulse generators 222-225 outputs a logical high value when the respective counters output 0x3. Other appropriate modifications may also be used and would be within the knowledge of one having ordinary skill in the art.

Other embodiments of the invention will be apparent to those skilled in the art from consideration of the specification and practice of the embodiments of the invention disclosed herein. It is intended that the specification and examples be considered as exemplary only, with a true scope and spirit of the invention being indicated by the following claims. As such, the invention is limited only by the following claims.

What is claims is:

1. A device receiving input, the device comprising:
   a clock generating section which receives a first clock signal having a first frequency and generates a plurality of phase-differentiated second clock signals of a second frequency higher than the first frequency; and
   a pulse-width modulated signal generating section which generates a pulse-width modulated signal as a function of the input data using one or more of the plurality of the phase-differentiated second clock signals and wherein the pulse-width modulated signal has a pulse width resolution equivalent to a third frequency that is an integral multiple of the first frequency.

2. The device of claim 1, wherein the clock generating section comprises a phase locked loop.

3. The device of claim 1, wherein the third frequency is N×M times the first frequency, where N is an integer indicating the multiple by which the second frequency exceeds the first frequency and M is the number of pulses in any one of the plurality of phase-differentiated second clock signals.

4. A device receiving input data, the device comprising:
   a clock generating section which receives a first clock signal having a first frequency and generates a plurality of phase-differentiated second clock signals of a second frequency higher than the first frequency;
   a plurality of pulse-width modulated circuits each receiving one of the plurality of phase-differentiated second clock signals and the input data, wherein each of the pulse-width modulated circuits generates a corresponding first pulse-width modulated signal synchronized with respect to its input phase-differentiated clock signal; and
   a logic circuit which receives the first pulse width modulated signals as input and outputs a second pulse-width modulated signal having a pulse width that is a function of the input data and wherein the second pulse-width modulated signal has a pulse width resolution equivalent to a third frequency that is an integral multiple of the first frequency.

5. The device of claim 4, wherein the plurality of phase-differentiated clock signals is a function of the input data.

6. The device of claim 4, wherein the clock generating section includes a phase locked loop circuit.

7. The device of claim 4, wherein the third frequency is N×M times the first frequency, where N is an integer indicating the multiple by which the second frequency exceeds the first frequency and M is the number of pulses in any one of the plurality of phase-differentiated second clock signals is M.

8. A receiving input data, the device comprising:
   a clock generating section, which receives a first clock signal having a first frequency and generates a plurality of phase-differentiated second clock signals of a second frequency higher than the first frequency;
   a plurality of pulse-width modulated circuits comprising,
      a primary pulse-width modulated circuit receiving the input data and one of the plurality of phase-differentiated clock signals, where the primary pulse-width modulated circuit generates its first pulse-width modulated signal corresponding to a primary clock domain of the input data, and
      one or more secondary pulse-width modulated circuits corresponding to each of the plurality of phase-differentiated clock signals, wherein each secondary pulse-width modulated circuit generates its corresponding first pulse-width modulated signal as a function of the input data; and
   a logic circuit, which receives the first pulse width modulated signals as input and outputs a second pulse-width modulated signal having a pulse width that is a function of the input data.

9. The device of claim 8, wherein the logic circuit comprises an AND circuit which outputs a logical combination of the first pulse-width modulated signals generated by the primary pulse-width modulated circuit and the one or more secondary pulse-width modulated circuits.

10. A receiving input data, the device comprising:
    a clock generating section, which receives a first clock signal having a first frequency and generates a plurality of phase-differentiated second clock signals of a second frequency higher than the first frequency;
    a plurality of pulse-width modulated circuits each receiving one of the plurality of phase-differentiated second clock signals and the input data, wherein
       each of the pulse-width modulated circuits generates a corresponding first pulse-width modulated signal synchronized with respect to its input phase-differentiated clock signal, and
       wherein at least one of the plurality of pulse-width modulated circuits further comprises a synchronization circuit capable of receiving the input data and at least one of the plurality of phase-differentiated clock signals and outputting the input data in synchronization with the at least one of the plurality of phase-differentiated clock signals; and a logic circuit, which receives the first pulse width modulated signals as input and outputs a second pulse-width modulated signal having a pulse width that is a function of the input data.

11. The device of claim 10, further comprising a plurality of synchronization circuits, each coupled to a different one of the plurality of pulse-width modulated circuits and each coupled to a different one of the plurality of phase-differentiated clock signals.

12. A system for receiving input data, the system comprising:
   a clock generating component for receiving a first clock signal having a first frequency and generating a plurality of second clock signals of a second frequency higher than the first frequency; and
   a pulse-width modulated signal generating component for generating a pulse-width modulated signal as a function of the input data using one or more the plurality of phase-differentiated second clock signals and wherein the pulse-width modulated signal has a pulse width resolution equivalent to a third frequency that is an integral multiple of the first frequency.

13. The system of claim 12, wherein the clock generating component comprises a phase locked loop.

14. The system of claim 12, wherein the third frequency is N×M times the first frequency, where N is an integer indicating the multiple by which the second frequency exceeds the first frequency and M is the number of pulses in any one of the plurality of phase-differentiated second clock signals.

15. A method for receiving input data, the method comprising:
   receiving a first clock signal having a first frequency and generating a plurality of phase-differentiated second clock signals of a second frequency higher than the first frequency; and
   generating a pulse-width modulated signal as a function of the input data using one or more the plurality of phase-differentiated second clock signals, wherein the generated pulse-width modulated signal has a pulse width resolution equivalent to a third frequency that is an integral multiple of the first frequency.

16. The method of claim 15, wherein generating a plurality of phase-differentiated second clock signals is accomplished using a phase locked loop.

17. The method of claim 15, wherein the third frequency is N×M times the first frequency, where N is an integer indicating the multiple by which the second frequency exceeds the first frequency and M is the number of pulses in any one of the plurality of phase-differentiated second clock signals.

* * * * *